United States Patent [19]

Sawada et al.

[11] 4,443,826

[45] Apr. 17, 1984

[54] MAGNETO-RESISTIVE EFFECT TYPE MAGNETIC HEAD

[75] Inventors: Takeshi Sawada, Yokohama; Ko Yoneda, Kawasaki; Akira Shinmi, Kawasaki; Hiroshi Takagi, Kawasaki; Shuzo Abiko, Chichibu; Hirokazu Goto, Tokyo, all of Japan

[73] Assignees: Canon Kabushiki Kaisha, Tokyo; Canon Denshi Kabushiki Kaisha, Saitama, both of Japan

[21] Appl. No.: 314,417

[22] Filed: Oct. 23, 1981

[30] Foreign Application Priority Data

Oct. 29, 1980 [JP] Japan .................. 55-150646
Nov. 7, 1980 [JP] Japan .................. 55-155843

[51] Int. Cl.$^3$ .................. G11B 5/12; G11B 5/30; G11B 5/25
[52] U.S. Cl. .................. 360/113; 360/119; 360/125
[58] Field of Search .............. 360/113, 126, 122, 123, 360/125, 119, 121

[56] References Cited

U.S. PATENT DOCUMENTS

| | | | |
|---|---|---|---|
| 4,141,051 | 2/1979 | Kuijk | 360/113 |
| 4,286,299 | 8/1981 | Shirahata | 360/113 |
| 4,317,148 | 2/1982 | Chi | 360/119 |
| 4,385,334 | 5/1983 | Yanagida | 360/125 |

*Primary Examiner*—Robert Martin Kilgore
*Attorney, Agent, or Firm*—Fitzpatrick, Cella, Harper & Scinto

[57] ABSTRACT

The present invention is directed to improvements in a perpendicular magnetic recording-reproducing head. One of the improvements comprises the use of a magneto-resistive effect element to form the main pole of the magnetic head. This feature of the invention enables a stable and faithful reproduction of information recorded in a magnetic recording medium up to the shortest wavelength and to obtain a sufficiently large reproducing output signal. Another improvement comprises the use of such magneto-resistive effect elements in layers. The multilayer structure permits production of a large reproducing output and also an optimum S/N ratio even if the width of track is small.

5 Claims, 8 Drawing Figures

MAGNETO-RESISTIVE EFFECT TYPE MAGNETIC HEAD

BACKGROUND OF THE INVENTION

1. Field of the Invention

The present invention relates to a magneto-resistive effect type of recording head in which magnetic recording is carried using a magneto-resistive effect element that extends perpendicularly to the magnetic recording medium.

2. Description of the Prior Art

Figure 1:
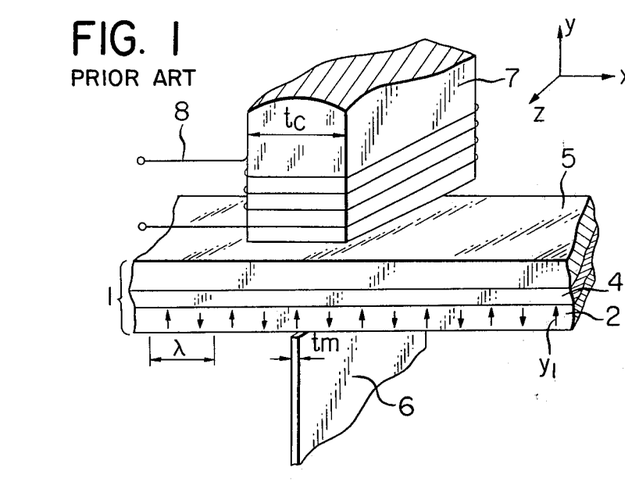
FIG. 1 is an enlarged perspective view of the essential part of a perpendicular recording magnetic recording and reproducing head according to the prior art.

Recently particular attention has been focused on the perpendicular magnetic recording method as a new development in high density magnetic recording techniques. FIG. 1 illustrates the known perpendicular recording method.

Generally designated by 1 is a magnetic recording medium which is shown, in FIG. 1, to be a magnetic tape. The surface of the magnetic recording medium 1 is coated with a layer of magnetic material 2 which exhibits a strong magnetic anisotropy in the vertical direction. The magnetic material layer 2 is 1 to 2 $\mu$m thick and is formed, for instance, by spattering of Co/Cr alloy. The arrows indicated by reference character $y_1$ illustrate the direction of magnetization.

The magnetic material layer 2 is backed up by a back-up layer 4 having a thickness of 1 to 2 $\mu$m and being formed using a permalloy of 80% Ni. The presence of this high permeability back-up layer 4 remarkedly improves the efficiency of recording and reproducing. Compared with the magnetic recording medium without such back-up layer, the magnetic recording medium 1 with the back-up layer 4 has 4 to 10 times higher recording and reproducing effect. Designated by 5 is a base film formed of a high molecular synthetic resin such as polyimide.

A main pole 6 and a subsidiary pole 7 are disposed facing each other with the multilayer-structured magnetic recording medium 1, described above passing therebetween. The main pole 6 is referred to also as first pole and forms together with the subsidiary pole 7 a recording magnetic head disposed perpendicularly to the recording medium. The main pole 6 is formed by vapor depositing 80% Ni permalloy (high permeability material) on a substrate. Its thickness tm is on the order of 1 to 2 $\mu$m. The subsidiary pole is referred to also as second pole and has a record reproducing winding 8 turned about it. As the material for the subsidiary pole 7 there is used a high permeability material such as MnZn ferrite or permalloy. Its thickness tc is in the order of 100 to 1000 $\mu$m and it is so formed as not to be saturated by current flowing into the winding 8. The number of turns of the winding 8 is variable depending on the frequency then used and is suitably selected within the range of from 100 to 1000 turns.

Figure 2:
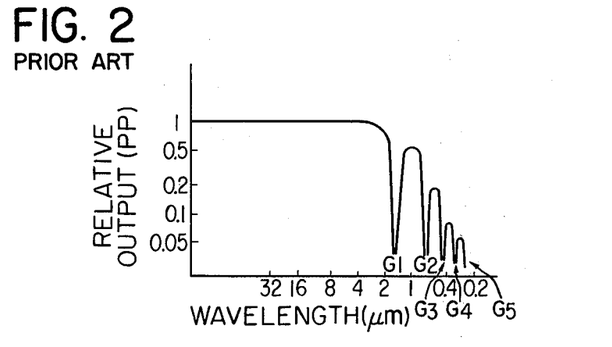
FIG. 2 is a graph showing the relation between recorded wavelength and relative output.

In the above described manner, the known perpendicular magnetic recording and reproducing system uses a magnetic recording medium having three layer structure 1 comprising as one layer magnetic material which exhibits a strong magnetic anisotropy in the perpendicular direction and as another layer a material of high permeability. The magnetic recording medium 1 passes through between the main pole 6 and the subsidiary pole 7. With this perpendicular magnetic recording and reproducing system it is possible to record and reproduce magnetic record wavelengths $\lambda$ up to 0.3 $\mu$m. FIG. 2 is a curve showing the state of reproduction of recorded information obtained with the magnetic recording system described above. Wavelength is plotted on the abscissa and the curve shows the state of digital record with two bits being one wavelength. As seen from the curve, no drop in reproducing output is observed even on the long wavelength side. This is compared with the case of the common induction type magnetic head wherein the reproducing output drops down on the long wavelength side.

In the perpendicular recording system illustrated in FIG. 1, recording/reproducing is carried out through the winding 8 on the subsidiary pole 7. In this case, until now, it has been undesirable to reduce the thickness tm of the main pole 6 to an extremely small value because it causes a reduction of the recording and reproducing efficiency. This limitation has brought about a problem in reproducing the recorded information. The problem is a gap loss caused by the thickness tm. Referring to FIG. 2, it is seen that there appear in the reproducing output curve some dips $G_1$-$G_5$ at the wavelengths of 1.6, 0.8, 0.53, 0.4, 0.32 and 0.27 $\mu$m respectively although the recorded wavelength $\lambda$ extends to 0.3 $\mu$m. If the thickness tm of the main pole 6 is further decreased in an attempt at the elimination of the above problem, then the reproducing output may be also decreased to such extent that difficulty arises in processing the signal. The reason for this is that the degree of magnetic flux focussing in reproduction is proportional to the thickness tm of the main pole 6.

In summary, the known perpendicular recording system has such a significant disadvantage that it is impossible to obtain reproducing signals in a stable manner up to the shortest wavelength of the recorded range of wavelength and the reproducing output signal obtainable is very low in signal level.

On the other hand, with the progress of the magnetic recording and reproducing technique in recent years, many attempts are now being made to develop thin film magnetic heads for further improvement of frequency characteristics. Among them, efforts are directed to development of each a recording head which can satisfy the increasing desire for lower running speed of the recording medium and multichannel recording and reproducing. To satisfy the requirement, the number of head elements is increasing and also the degree of integration per head element becomes higher and higher.

For example, speaking of reproducing heads, the conventional induction type thin film magnetic head has a reproducing output voltage proportional to the relative speed of the recording medium relative to the head. Therefore, the reproducing output decreases with decreasing running speed. To obtain a sufficiently large reproducing output even for a low running speed, the number of turns of the coil should be increased to 100 to 1000 turns. With such a large number of turns, the magnetic head is practically difficult to use as a thin film reproducing head.

As a solution to the above problem, there has been developed the magnetic flux response type magneto-resistive effect thin film magnetic head (hereinafter referred to simply as MR head) the output of which has no connection with the relative speed between the head and the recording medium.

Figure 3:
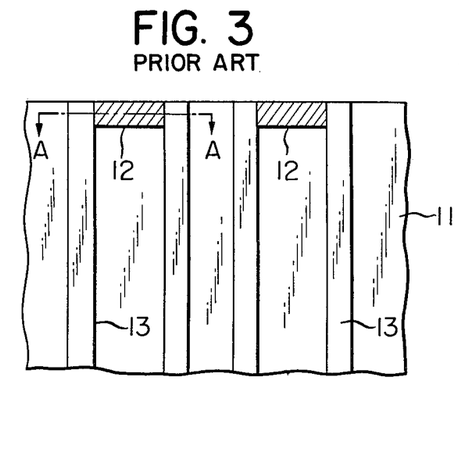
FIG. 3 is a partially enlarged plan view of a magneto-resistive effect type head according to the prior art and FIG. 4 is a partially enlarged sectional view taken along the line A—A in FIG. 3.
Figure 4:
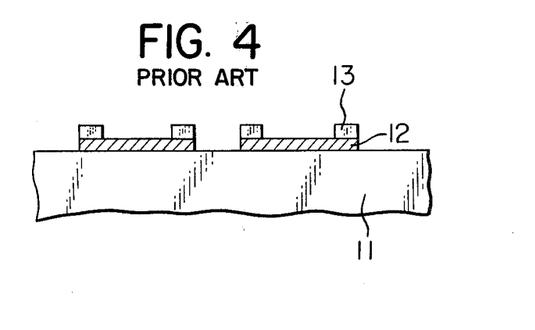

An example of known MR head is shown in FIGS. 3 and 4.

Designated at 11 is an electrically insulating and non-magnetic substrate. 12 are Mr Head elements having a magneto-resistive effect. MR head elements 12 are formed on one surface of the substrate 11 on which a magnetic recording medium slide moves. These elements 12 can be formed employing the known thin film depositing technique or other suitable technique. 13 is an electroconductive layer connected with the both ends of MR head element 12. These electroconductive layers 13 are also formed on the substrate 11.

A constant current is applied to MR head elements 12 through the electroconductive layer 13. Under the condition, when an external magnetic field such as a magnetic tape approaches the elements 12, then the resistive value of the elements 12 change. The reproducing output voltage $\Delta V$ obtained at this time is represented by:

$$\Delta V = \Delta R I \qquad (1)$$

wherein, $\Delta R$ is change of resistive of the MR element caused by the external magnetic field and I is the value of the constant current applied to the MR element.

The changing rate of resistive change of MR elements 12 caused by an external magnetic field is generally in the order of 1 to 3% for MR element formed of Ni-Fe or Ni-Co. As seen from the aboe equation (1), therefore, in order to obtain a larger reproducing output it is necessary to increase the absolute resistive of each an MR element. The reluctance R of MR element is generally represented by:

$$R = \rho_{MR} \times \frac{l}{w \times t} \qquad (2)$$

wherein, $\rho_{MR}$ is specific resistive of the MR element;
l is length of the MR element;
w is width of the same; and
t is thickness of the same.

As will be readily understood from the above equation (2), the requirements for a larger resistive of an MR element are to increase the length of the MR element 12 and to reduce the width and thickness thereof.

However, since at present the elements are formed by employing the thin film forming technique, it is impossible to reduce the thickness of the element so much. As for the width of the element, techiques available therefor such as photo etching also have some technical limitations. Therefore, it is impossible to reduce the width to a great extent.

The length of an MR head element 12 corresponds to the track width of the reproducing head. As previously mentioned, at present there is an increasing desire for a high density magnetic recording and reproducing system which needs a multichannel and highly integrated magnetic head. To meet the desire, it is required to reduce the track width, that is, to shorten the length of MR element. As seen from the above equation (2), this means a smaller reproducing output.

SUMMARY OF THE INVENTION

Accordingly it is an object of the invention to provide a magnetic head which enables a stable and faithful reproduction of information recorded in a magnetic recording medium up to the shortest wavelength of the information and with which a sufficiently large reproducing output signal can be obtained.

It is another object of the invention to provide a magnetic head which produces a large reproducing output and an optimum S/N ratio even when the width of track formed by magneto-resistive effect elements is small.

Other and further objects, features and advantages of the invention will appear more fully from the following description taken in connection with the accompanying drawings.

BRIEF DESCRIPTION OF THE DRAWINGS

FIGS. 1 to 4 illustrate magnetic recording and reproducing heads according to the prior art of which

FIGS. 5 to 8 illustrate preferred embodiments of the present invention of which

DETAILED DESCRIPTION OF PREFERRED EMBODIMENTS

Figure 5:
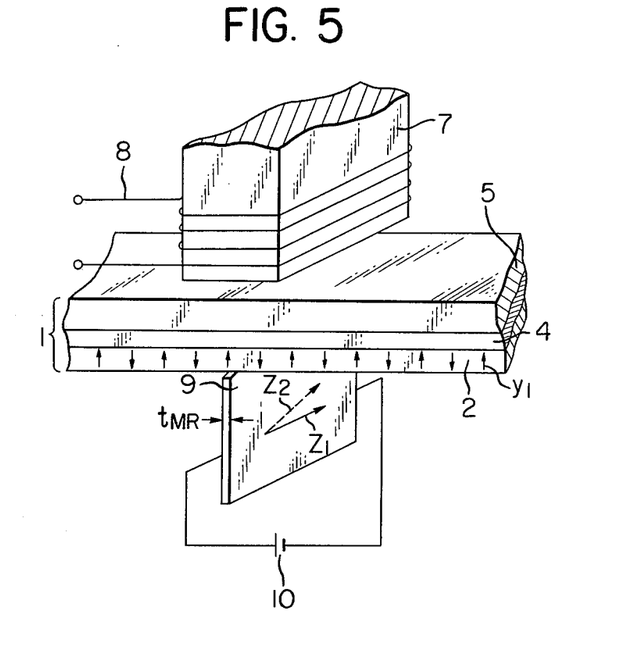
FIG. 5 is an enlarged perspective view of the essential part of a perpendicular recording magnetic recording and reproducing head according to the invention.

FIG. 5 shows an embodiment of the present invention in which like reference characters to FIG. 1 represent the same or corresponding elements.

In this embodiment, there is used an MR element magneto-resistive effect element) 9 as the main pole. The MR element 9 is formed by thin film deposition of Ni/Fe, Ni/Co or the like on a non-magnetic substrate. The MR element 9 can be formed as a very thin layer by deposition. Therefore, the value of $t_{MR}$ which corresponds to gap width can be set to a value within the range of 0.02 to 0.1 $\mu$m. As any dip due to gap loss never appears throughout all of the recorded wavelength range up to about 0.1 $\mu$m, a stable reproduction of the recorded information can be assured.

When a power source 10 is connected to the MR element 9 to flow current in the direction of arrow $Z_1$, the direction of magnetization $Z_2$ varies depending on the intensity of an external magnetic field, namely a magnetic record on the magnetic recording medium 1. The resistive of the MR element 9 varies depending on the change in $Z_2$.

In the prior art head, the amount of magnetic flux flowing through the main pole substantially determines the magnetic flux of the subsidiary pole and the time differential waveform of the latter constitutes the reproducing output. Therefore, the output decreases with decreasing the thickness of the main pole.

In contrast, when the MR element is used to form the main pole according to the invention, the output is determined solely by the magnetic field existing in the area where the main pole was set. Therefore, it is possible to reduce the value of $t_{MR}$ thereby improving the resolving power. At the same time, it is possible to obtain such output voltage having no relation to the resolving power.

In this manner, the use of the MR element as the main pole produces a stable reproducing signal up to the shortest wavelength of the recorded information. Thus, there is provided a magnetic recording and reproducing head with which a sufficiently large reproducing output signal can be obtained.

Figure 6:
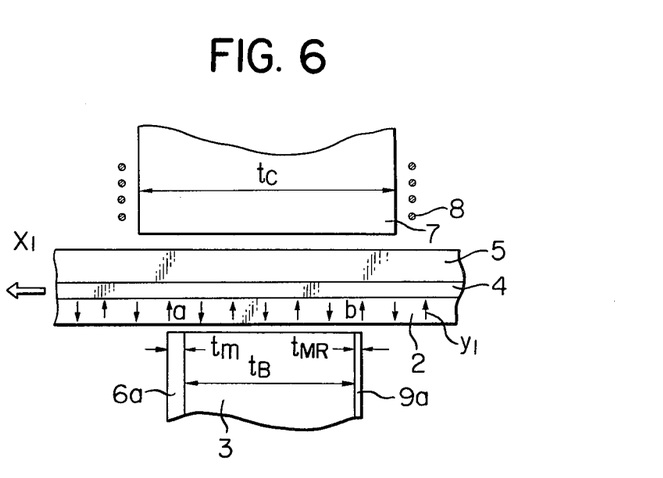
FIG. 6 is a partially enlarged plan view of another perpendicular recording magnetic head according to the invention.

FIG. 6 shows another embodiment of the invention. Like reference characters to FIG. 5 represent the same and corresponding elements which need not to be further described.

According to the embodiment, the problem of reduction of recording efficiency caused by the small thickness of the MR element serving as the main pole is solved and a further improvement in recording characteristics is attained without any loss of advantages obtainable from the use of an MR element.

In the embodiment, the main pole structure comprises a MR element 9a for reproducing and a write-only magnetic pole 6a. As shown in FIG. 6, the MR element 9a having a thickness $t_{MR}$ is formed on one side of the non-magnetic substrate 3 and the write-only magnetic pole 6a having thickness tm is on the other side of the substrate. Both of MR element 9a and write-only magnetic pole 6a are formed employing a thin film depositing method. As a modification, MR element 9a and magnetic pole 6a may be formed on two separate substrates which are joined together later.

In the above structure, the thickness $t_B$ of the substrate 3 and the thickness tc of the subsidiary magnetic pole 7 should satisfy the following condition:

$$tc > t_{MR} + tm + t_B \quad (1)$$

When the above condition (1) is satisfied, the thickness tm of the write-only magnetic pole 6a has almost no effect on the recorded wavelength. Therefore, the thickness tm can be selected taking into account only the writing efficiency and a substantial reduction of recording current can be attained.

As for the thickness $t_B$ of the substrate 3, the condition which it has to satisfy is only that no magnetic interaction should occur at the time of signal reproduction between the write-only magnetic pole 6a and MR element 9a which is the reproduction-only magnetic pole. Specifically, a thickness about 10 to 100 times larger than the reproduced wavelength is sufficient for the thickness $t_B$ to satisfy this requirement. As to the thickness $t_{MR}$ of MR element 9a it has been found that when the thickness $t_{MR}$ is less than ⅓ of the shortest wavelength to be reproduced, there appears no dip by gap loss and therefore a large output voltage can be obtained. Consequently, the condition, $t_{MR} < tm$ is given.

In the magnetic recording and reproducing head having the above structure, recording is performed at the point a on the side of magnetic pole 6a while flowing current into the coil 8. But, reproducing is carried out not through the coil 8 but at the point b on the side of MR element 9a. However, even upon reproducing, the subsidiary magnetic pole 7 has an effect to increase the magnetic field in the vicinity of the point b. As the magnetic field about the point b may be intensified in this manner to some extent, care should be taken to prevent damagnetization caused by the intensified magnetic field. On recording, the recording medium should be driven running in the direction indicated by arrow $\chi_1$ in FIG. 6.

With the arrangement of the above embodiments, the advantageous properties of an MR element can be utilized to the full extent and also a substantial improvement of recording efficiency can be attained.

In the magnetic recording and reproducing head of the type in which recording is carried out perpendicularly on a magnetic recording medium passing between a main magnetic pole and a subsidiary magnetic pole, the arrangement of the present invention is characterized in that on the main magnetic pole side there is provided a magneto-resistive effect element formed of a high permeability magnetic material. Owing to the inventive arrangement, it is made possible to reproduce the information recorded on the magnetic recording medium in a very stable manner up to the shortest wavelength of the recorded information and also to obtain a sufficiently large reproducing output signal.

Figure 7:
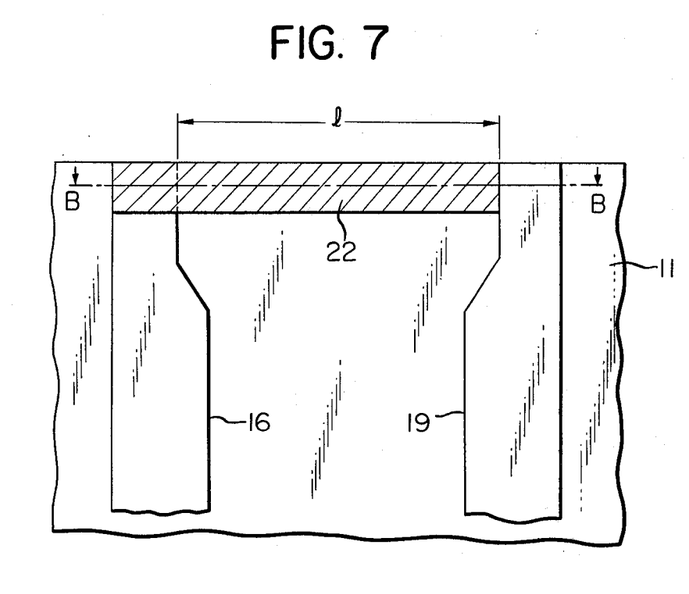
FIG. 7 is a partially enlarged plan view of a magneto-resistive effect type head according to the invention and FIG. 8 is a partially enlarged sectiional view taken along the line B—B in FIG. 7.
Figure 8:
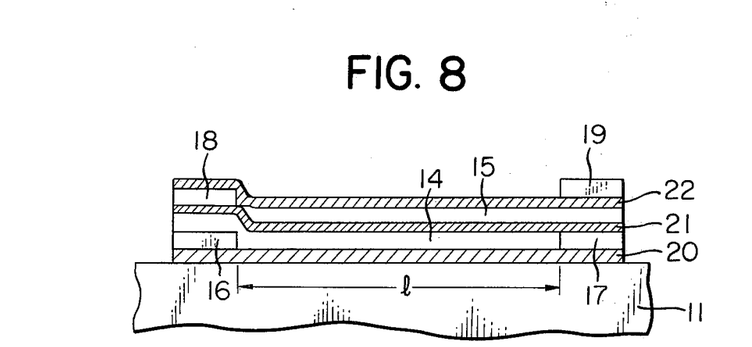

FIGS. 7 and 8 illustrate another preferred embodiment of the invention.

Designated by 11 is an electrically insulating and nonmagnetic substrate. At the side of the substrate 11 and on one surface of the substrate on which a magnetic recording medium slideably moves, there are formed MR elements 20, 21 and 22 in three layers separated by insulating layers 14 and 15. These MR elements 20 to 22 are formed by a thin film depositing technique or other suitable technique. These MR elements 20 to 22 are electrically connected to each other in series by electroconductive layers 16 to 19 formed between the MR element layers and alternately at the left end side and at the right end side of the layers. Of the four electroconductive layers the layers 16 and 19 function as lead-input-output wire and the other two layers 17 and 18 function as connection wire.

In this arrangement, the width of reproducing track is determined by the width l between the electroconductive layers 16 and 17. The gap width is determined by the total thickness of three MR element layers 20 to 22 and two insulating layers 14 and 15.

This embodiment of the invention has the following effects and advantages:

The three layer structure of MR elements 20 to 22 has an effect to increase the resistive by three times. Since the changing rate of resistive is always the same for a single layer and for three layers, it will be seen from the above equation (1) that by making use of the three layer structure in a reproducing head there is obtained an output voltage three times larger than that of a single layer structure.

All of the MR elements, electroconductive layers and insulating layers can be formed employing a thin film forming method such as vapor deposition, spattering, plating and photo etching. Therefore, the manufacture can be carried out with very high dimensional precision.

The number of MR element layers is not limited only to three shown in the embodiment. Any number of layers more than two may be used. The number of layers can be selected at will considering the reproducing output then required, and the width and pitch of the track then desired.

If n layers of MR elements are used, then the reproducing output voltage S can be represented by:

$$S = \sum_{i=1}^{n} V_{si} \quad (3)$$

wherein, $V_{si}$ is output obtained from the i-th layer of MR element and n is the total number of MR element layers formed.

As to noise, there may be produced mainly random noises such as noise by heat and excess noise. These noises N in total can be represented by:

$$N = \left( \sum_{i=1}^{n} V_{Ni}^2 \right)^{\frac{1}{2}} \quad (4)$$

wherein, $V_{Ni}$ is noise output generated from the i-th layer of MR element.

Therefore, from (3) and (4), S/N ratio can be represented by:

$$S/N = \frac{\sum_{i=1}^{n} V_{si}}{\left( \sum_{i=1}^{n} V_{Ni}^2 \right)^{\frac{1}{2}}} \quad (5)$$

In the above described embodiment, the number of MR element layers is three and they all have the same shape. Therefore, $$V_{s1} = V_{s2} = V_{s3} \quad (6)$$

$$V_{N1} = V_{N2} = V_{N3} \quad (7)$$

From (6) and (7), $$S/N = \frac{n}{\sqrt{n}} \cdot \frac{V_{si}}{V_{Ni}} = \sqrt{n} \, \frac{V_{si}}{V_{Ni}} \quad (8)$$

This means that by employing the three layer structure of the embodiment of the invention shown in FIGS. 7 and 8, S/N ratio can be improved up by $\sqrt{3}$ times as compared with that of a single layer structure. Therefore, it is obvious that remarkedly large improvement in S/N ratio is attainable by using the multilayer structure according to the invention.

As understood from the foregoing, the second embodiment shown in FIGS. 7 and 8 is featured in that MR elements are arranged in layers with an insulating layer between the MR element layers and these MR elements are electrically connected in series. This feature makes it possible to increase the reproducing output voltage and also improve the S/N ratio while managing the tendency to increase the degree of integration for a multichannel thin film head.

The multilayer structure of MR elements 20 to 22 shown in FIGS. 7 and 8 may be applied also to the parts of 9 and 9a shown in FIGS. 5 and 6 to realize a magneto-resistive effect type magnetic head which permits reproduction of the recorded information in a stable manner up to the shortest wavelength while increasing the reproducing output voltage and further improving the S/N ratio at the same time.

What we claimed is:

1. A magneto-resistive effect type magnetic head for recording on and reproducing from a recording medium, said magnetic head comprising:
    a subsidiary magnetic pole formed of a high permeability material and having a coil turned around the magnetic pole;
    a substrate disposed in opposition to said subsidiary magnetic pole;
    a main magnetic pole formed of a magneto-resistive effect element arranged on a side of said substrate where a recording medium in motion enters said head; and
    a recording magnetic pole formed of a high permeability material arranged on a side of said substrate where the recording medium in motion leaves the head.

2. A magnetic head as set forth in claim 1 wherein the thickness tm of said recording magnetic pole in the direction of recording medium movement is larger than the thickness $t_{MR}$ of said main magnetic pole in the direction of recording medium movement.

3. A magnetic head as set forth in claim 1 wherein said main magnetic pole comprises a plurality number of magneto-resistive effect elements arranged in layers with insulating layers interposed therebetween and with said layers connected in series by being connected at alternating end portions by a conductor.

4. A magnetic head as set forth in claim 1, 2 or 3 wherein the total of the thicknesses $t_{MR}$ of said main magnetic pole, $t_B$ of said substrate and tm of said recording magnetic pole, in the direction of recording medium movement, are smaller than the thickness tc of said subsidiary magnetic pole.

5. A magneto-resistive effect type magnetic head comprising:
    a plural number of magneto-resistive effect elements formed in layers on a substrate;
    an insulator interposed between said layers of magneto-resistive effect elements; and
    a conductor for connecting said magneto-resistive effect elements in series with each other by connecting said layers at alternate end portions thereof.

* * * * *

UNITED STATES PATENT AND TRADEMARK OFFICE
CERTIFICATE OF CORRECTION

PATENT NO. : 4,443,826
DATED : April 17, 1984
INVENTOR(S) : TAKESHI SAWADA, et al.

It is certified that error appears in the above-identified patent and that said Letters Patent is hereby corrected as shown below:

Column 1, line 9, insert --out-- after "carried--;
         line 40, insert --,-- after "above".
Column 2, line 68, change "Mr Head" to --MR head--.
Column 3, line 12, change "resistive" to --resistance--;
         line 18, change "resistive" to --resistance--;
         line 21, change "resistive" to --resistance--;
         line 24, change "aboe" to --above--;
         line 26, change "resistive" to --resistance--;
         line 27, change "reluctance" to --resistance--;
         line 34, change "resistive" to --resistance--;
         line 39, change "resistive" to --resistance--;
         line 45, change "techiques" to --techniques--;
Column 4, line 29, change "sectiional" to --sectional--;
         line 38, insert --(-- before "magneto";
         line 53, change "resistive" to --resistance--.
Column 5, line 9, delete --to-- before "be";
         line 18, change "a MR" to --an MR--;
         line 22, insert --a-- before "thickness--;
         line 22, delete "of" before "MR".
Column 6, line 43, change "resistive" to --resistance--;
         line 44, change "resistive" to --resistance--.
Column 7, line 10, change "V$^2$Ni" to --$V_{Ni}^2$--.

Signed and Sealed this

Sixteenth Day of October 1984

[SEAL]

Attest:

GERALD J. MOSSINGHOFF

Attesting Officer      Commissioner of Patents and Trademarks

UNITED STATES PATENT AND TRADEMARK OFFICE
CERTIFICATE OF CORRECTION

PATENT NO. : 4,443,826

DATED : April 17, 1984

INVENTOR(S) : TAKESHI SAWADA, et al.

It is certified that error appears in the above-identified patent and that said Letters Patent is hereby corrected as shown below:

Column 1, line 9, insert --out-- after "carried--;
          line 40, insert --,-- after "above".
Column 2, line 68, change "Mr Head" to --MR head--.
Column 3, line 12, change "resistive" to --resistance--;
          line 18, change "resistive" to --resistance--;
          line 21, change "resistive" to --resistance--;
          line 24, change "aboe" to --above--;
          line 26, change "resistive" to --resistance--;
          line 27, change "reluctance" to --resistance--;
          line 34, change "resistive" to --resistance--;
          line 39, change "resistive" to --resistance--;
          line 45, change "techiques" to --techniques--;
Column 4, line 29, change "sectiional" to --sectional--;
          line 38, insert --(-- before "magneto";
          line 53, change "resistive" to --resistance--.
Column 5, line 9, delete --to-- before "be";
          line 18, change "a MR" to --an MR--;
          line 22, insert --a-- before "thickness--;
          line 23, delete "of" before "MR".

UNITED STATES PATENT AND TRADEMARK OFFICE
CERTIFICATE OF CORRECTION

PATENT NO. : 4,443,826
DATED : April 17, 1984
INVENTOR(S) : TAKESHI SAWADA, et al.

It is certified that error appears in the above-identified patent and that said Letters Patent is hereby corrected as shown below:

Column 6, line 43, change "resistive" to --resistance--;
          line 44, change "resistive" to --resistance--.
Column 7, line 10, change "$V^2Ni$" to --$V_{Ni}2$--.

This certificate supersedes certificate of correction issued October 16, 1984.

*Signed and Sealed this*

*Twenty-second* Day of *October 1985*

[SEAL]

*Attest:*

*Attesting Officer*

DONALD J. QUIGG

*Commissioner of Patents and Trademarks—Designate*